(12) United States Patent
La Frese et al.

(10) Patent No.: US 8,244,868 B2
(45) Date of Patent: Aug. 14, 2012

(54) THIN-PROVISIONING ADVISER FOR STORAGE DEVICES

(75) Inventors: Lee Charles La Frese, Tucson, AZ (US); Brian Jay Smith, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 12/054,025

(22) Filed: Mar. 24, 2008

(65) Prior Publication Data

US 2009/0240809 A1 Sep. 24, 2009

(51) Int. Cl.
*G06F 15/173* (2006.01)
(52) U.S. Cl. .................................. 709/226; 709/224
(58) Field of Classification Search .................. 709/226
See application file for complete search history.

(56) References Cited

U.S. PATENT DOCUMENTS

| | | | | |
|---|---|---|---|---|
| 5,751,969 | A * | 5/1998 | Kapoor | 709/235 |
| 7,043,619 | B1 * | 5/2006 | Knight | 711/170 |
| 7,146,474 | B2 | 12/2006 | Nguyen et al. | |
| 7,292,969 | B1 | 11/2007 | Aharoni et al. | |
| 7,461,223 | B2 * | 12/2008 | Anand et al. | 711/162 |
| 7,552,208 | B2 * | 6/2009 | Lubrecht et al. | 709/223 |
| 2004/0230766 | A1 | 11/2004 | Cameron | |
| 2005/0108292 | A1 | 5/2005 | Burton et al. | |
| 2005/0273556 | A1 * | 12/2005 | Gellai et al. | 711/114 |
| 2006/0161753 | A1 * | 7/2006 | Aschoff et al. | 711/170 |
| 2007/0027985 | A1 * | 2/2007 | Ramany et al. | 709/224 |
| 2007/0136395 | A1 * | 6/2007 | Fries et al. | 707/204 |
| 2007/0233868 | A1 | 10/2007 | Tyrrell et al. | |
| 2008/0091748 | A1 * | 4/2008 | Beniyama et al. | 707/205 |
| 2008/0104350 | A1 * | 5/2008 | Shimizu et al. | 711/165 |
| 2009/0240880 | A1 * | 9/2009 | Kawaguchi | 711/114 |

OTHER PUBLICATIONS

Warden, Tim, "Storage Pooling, Thin Provisioning and Over Subscription," 5 pages, http://www.las-solanas.com/storage_virtualization/thin_provisioning.php <retrieved on Nov. 26, 2007>.
Osuna et al., "Thin Provisioning in an IBM SAN or IP SAN Enterprise Environment", IBM.com/redbooks, Aug. 28, 2007, 18 pages.

* cited by examiner

*Primary Examiner* — Christopher Biagini
(74) *Attorney, Agent, or Firm* — Griffiths & Seaton PLLC

(57) ABSTRACT

A method, apparatus, and computer program product for thin-provisioning of storage in a storage system by an adviser is provided. A workload profile of the storage is created from performance data. The workload profile includes a measurement of changed data per a predetermined time and resource utilization data over a period of time. A capacity estimate is derived from the measurement of changed data per a predetermined time. A placement estimate is derived from the resource utilization data obtained over a period of time. A target capacity is recommended to a user based on the capacity estimate. A placement location is recommended to a user based on the placement estimate. A predicted resource utilization is provided to the user based on the capacity estimate or the placement estimate.

20 Claims, 4 Drawing Sheets

THIN-PROVISIONING ADVISER FOR STORAGE DEVICES

BACKGROUND OF THE INVENTION

1. Field of the Invention

The present invention relates in general to computers, and more particularly to apparatus, method and computer program product embodiments of a thin-provisioning adviser for a plurality of storage devices in a computer system.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, work stations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle.

A computer network of a business may have multiple storage networks that are located remote from one another and a business user. The storage networks may also be hosted on different types of systems. To perform the job correctly, the business user may require fast and reliable access to the data contained in all of the storage networks. Information Technology (IT) employees must be able to provide high-speed, reliable access to the business users.

Storage area networks (SANs) are high-speed, high-bandwidth storage networks that logically connect the data storage devices to servers. The business user, in turn, is typically connected to the data storage devices through the server. SANs extend the concepts offered by traditional server/storage connections and deliver more flexibility, availability, integrated management and performance. SANs are the first IT solutions to allow users access to any information in the enterprise at any time. Generally the SAN includes management software for defining network devices such as hosts, interconnection devices, storage devices, and network attach server (NAS) devices. The SAN management software also allows links to be defined between the devices.

One important component in reaching this goal is to allow the SAN to be fully understood by those designing and maintaining the SAN. It is often difficult to quickly understand the SAN due to its complexity. Tools that allow the configuration of the SAN to be understood and changed quickly are beneficial.

SUMMARY OF THE INVENTION

Many disk storage systems, such as SANs, employ various techniques to create a near instantaneous point in time copy of disk volumes. In many cases, these copies are made for a specific purpose, such as application testing, dumping a copy to tape, or providing a temporary recovery copy in the event of a file corruption. If the copy is short-lived, it may not be necessary to allocate the full capacity of the source volume for the target. When using thinly provisioned target storage spaces, it is important to allocate enough space such that it is very unlikely to run out, but not so much so that storage space is wasted.

In addition, it is important that the target space be allocated where there is sufficient performance capability to handle the input/output (I/O) traffic between source and target storage. Of course, the performance capability of the target storage may depend on other workload that may also exercise the same resources where the targets may be allocated.

The current and only known solution to this allocation problem is for a storage administrator, with some knowledge about available capacity, to decide how large and where the targets should be allocated. This decision is usually based solely on capacity considerations, since the performance data for storage is difficult to characterize and recall, and subject to changing workload environments. For thinly provisioned point in time copies, the workload performance characterization, especially the write behavior, is essential to making wise choices for provisioning the target space. A need exists for a mechanism to assist a user such as a storage administrator to make effective choices for provisioning the target space in storage systems such as SANs.

Accordingly, in one embodiment, by way of example only, a method for thin-provisioning of storage in a storage system by an adviser is provided. A workload profile of the storage is created from performance data. The workload profile includes a measurement of changed data per a predetermined time and resource utilization data over a period of time. A capacity estimate is derived from the measurement of changed data per a predetermined time. A placement estimate is derived from the resource utilization data obtained over a period of time. A target capacity and a placement location is recommended to a user. The target capacity is based on the capacity estimate and the placement location is based on the placement estimate. A predicted resource utilization is provided to the user based on the capacity estimate or the placement estimate.

In another embodiment, again by way of example only, an administrator device for thin-provisioning of storage for a plurality of storage devices is provided. A memory module is adapted for storing a workload profile of the storage created from performance data. The workload profile includes a measurement of changed data per a predetermined time and resource utilization data over a period of time. A capacity estimation module is in communication with the memory module. The capacity estimation module is adapted for deriving a capacity estimate from the measurement of changed data per a predetermined time. A placement estimation module is in communication with the capacity estimation module. The placement estimation module is adapted for deriving a placement estimate from the resource utilization data obtained over a period of time. An adviser module is in communication with the placement estimation module. The adviser module is adapted for recommending a target capacity to a user based on the capacity estimate, recommending a placement location to a user based on the placement estimate, and providing a predicted resource utilization to the user based on the capacity estimate or the placement estimate.

In still another embodiment, again by way of example only, a computer program product for thin-provisioning storage in a storage system by an adviser is provided. The computer program product comprises a computer-readable storage medium having computer-readable program code portions stored therein. The computer-readable program code portions include a first executable portion for creating a workload profile of the storage from performance data, the workload profile including a measurement of changed data per a predetermined time and resource utilization data over a period of time, a second executable portion for deriving a capacity estimate from the measurement of changed data per a predetermined time, a third executable portion for deriving a placement estimate from the resource utilization data obtained over a period of time, a fourth executable portion for recommending a placement location to a user based on the placement estimate, and a fifth executable portion for providing a predicted resource utilization to the user based on the capacity estimate.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for thin-provisioning storage in a computing environment associated with a storage system. The thin-provisioning mechanisms are facilitated by the functionality of an adviser, as further described. The adviser is operable on the computing environment. The exemplary embodiments featuring these mechanisms may apply to a variety of thin-provisioning of storage in a computer environment. In one embodiment, for example, the mechanisms provide for thin-provisioning (incorporating capacity and placement) for point in time copy targets.

The mechanisms described below may relieve a storage administrator of time-consuming research and effort before making an informed storage provisioning decision on his own. Further, the mechanisms use historical performance information that the administrator may not know or understand how to use to aid in making an informed decision. Finally, the mechanisms can assist the storage administrator to determine if thin-provisioning is even a viable alternative to normal full-capacity provisioning. In this view, the mechanisms may estimate potential capacity savings that may result from implementation.

Figure 1:
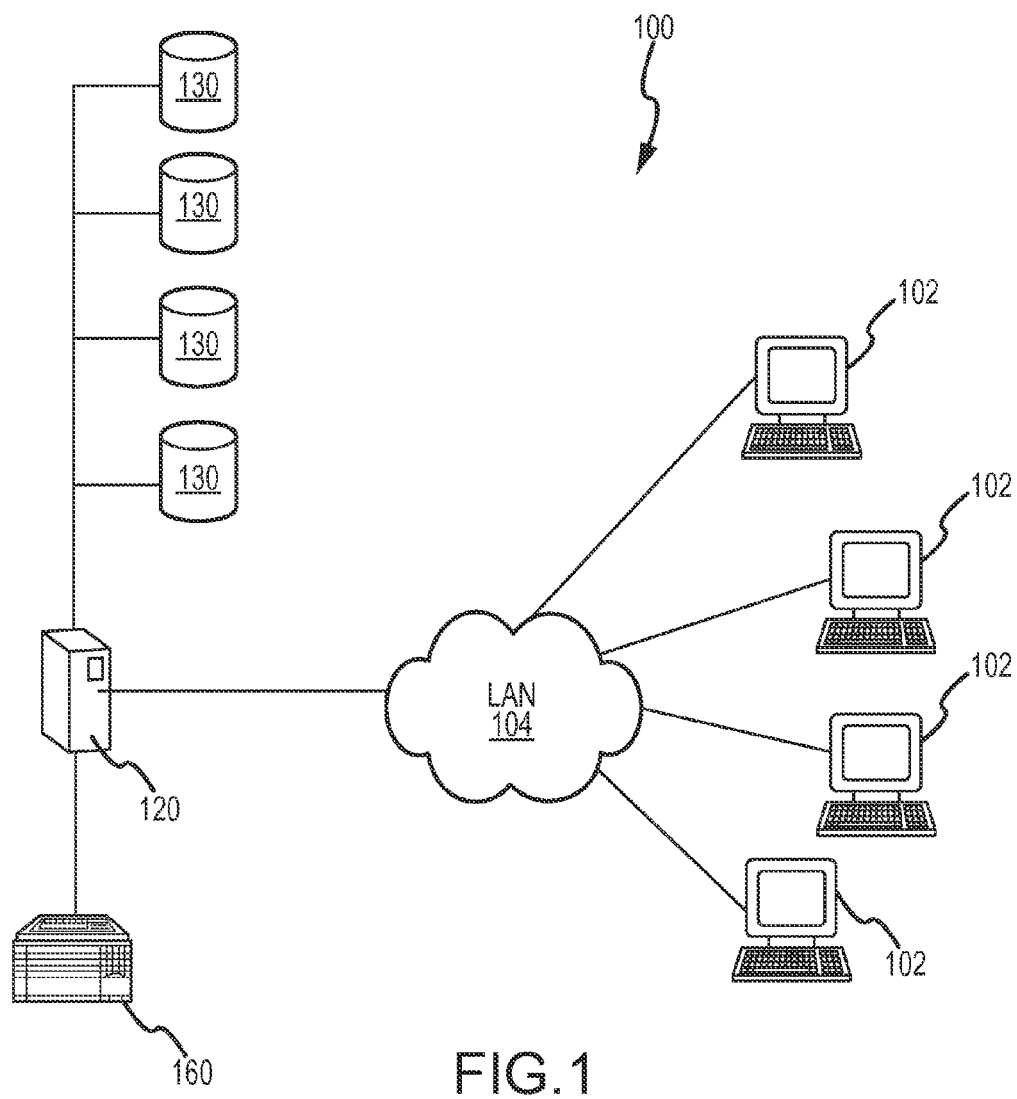
FIG. 1 illustrates an exemplary computer network in the form of a local area network.
Figure 2:
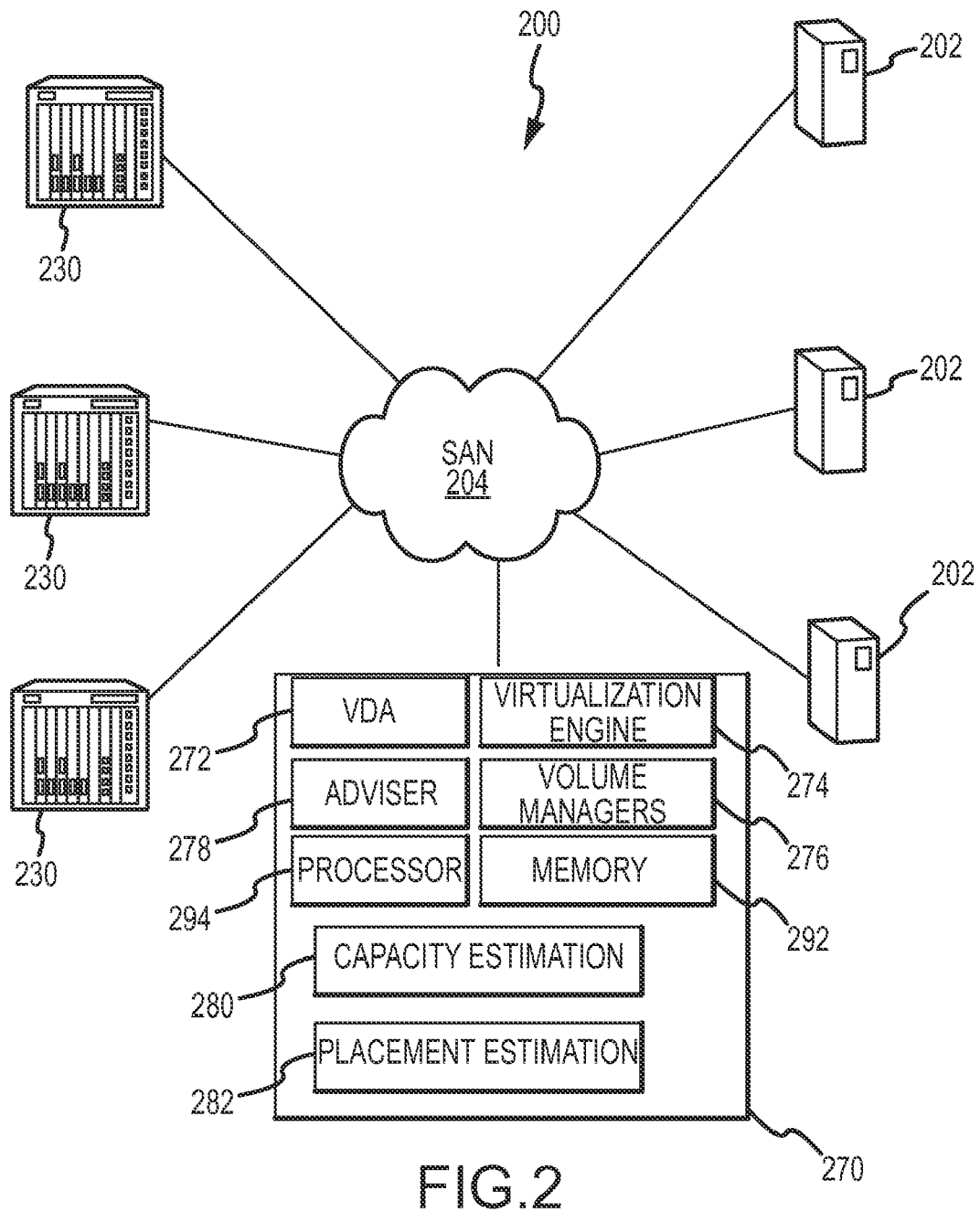
FIG. 2 illustrates an exemplary SAN and associated administrator device.

FIGS. 1 and 2 hereafter provide examples of computer environments in which the mechanisms of the following embodiments may be implemented. It should be appreciated, however, that FIGS. 1 and 2 are only exemplary and are not intended to state or imply any limitation as to the particular architectures in which the exemplary aspects of the various embodiments may be implemented. Many modifications to the architecture depicted in FIGS. 1 and 2 may be made without departing from the scope and spirit of the following description and claimed subject matter.

FIG. 1 illustrates a computer network 100 in the form of a local area network (LAN). In FIG. 1, workstation nodes 102 are coupled to a server 120 via a LAN interconnection 104. Data storage 130 is coupled to the server 120. LAN interconnection 100 may be any number of network topologies, such as Ethernet.

The network shown in FIG. 1 is known as a client-server model of network. Clients are devices connected to the network that share services or other resources. A server 120 administers these services or resources. A server 120 is a computer or software program, which provides services to clients 102. Services that may be administered by a server include access to data storage 130, applications provided by the server 120 or other connected nodes (not shown), or printer sharing 160.

In FIG. 1, work stations 102 are clients of server 120 and share access to data storage 130 that is administered by server 120. When one of work stations 102 requires access to data storage 130, the workstation 102 submits a request to server 120 via LAN interconnect 100. Server 120 services requests for access from work stations 102 to data storage 130. One possible interconnect technology between server and storage is the traditional SCSI interface.

As networks such as shown in FIG. 1 grow, new clients 102 may be added, more storage 130 may be added and servicing demands may increase. As mentioned above, server 120 will service all requests for access to storage 130. Consequently, the workload on server 120 may increase dramatically and performance may decline. To help reduce the bandwidth limitations of the traditional client server model, Storage Area Networks (SAN) have become increasingly popular in recent years. Storage Area Networks interconnect servers and storage at high speeds. By combining existing networking models, such as LANs, with Storage Area Networks, performance of the overall computer network may be improved.

FIG. 2 shows one embodiment of a SAN 200 according to an embodiment of the present invention. In FIG. 2, servers 202 are coupled to data storage devices 230 via SAN interconnect 204. Each server 202 and each storage device 230 is coupled to SAN interconnect 204. Servers 202 have direct access to any of the storage devices 230 connected to the SAN interconnect 204. SAN interconnect 204 can be a high speed interconnect, such as Fibre Channel or small computer systems interface (SCSI). In addition, SAN interconnect 204 can be an Internet Small Computers System Interface (iSCSI), a Fiber Connectivity (FICON) storage protocol, or Serial Attached SCSI (SAS) attached storage. As FIG. 2 shows, the servers 202 and storage devices 230 comprise a network in and of themselves.

In the SAN 200 of FIG. 2, no server 202 is dedicated to a particular storage device 230 as in a LAN. Any server 202 may access any storage device 230 on the SAN 200 in FIG. 2. Typical characteristics of a SAN 200 may include high bandwidth, a multitude of nodes per loop, a large connection distance, and a very large storage capacity. Consequently, the performance, flexibility, and scalability of a Fibre Channel based SAN 200 may be significantly greater than that of a typical SCSI based system.

FIG. 2 also shows a network administrator 270 coupled to the SAN interconnect 204. Being able to effectively allocate storage 230 in a SAN 200 in a manner that provides for adequate data protection and recoverability is of particular importance. Because multiple hosts may have access to a particular storage array 230 in a SAN 200, prevention of unauthorized and/or untimely data access is desirable. Zoning is an example of one technique that is used to accomplish this goal. Zoning allows resources to be partitioned and managed in a controlled manner. The administrator 270 may be used to map hosts to storage and provide control to allocation of the storage devices 230.

The administrator 270 may be configured to aid in the selection of storage locations within a large network of storage elements. The administrator 270 includes a storage virtualization optimizer 272 that, according to an embodiment of the present invention, processes input/output in accordance with a customer's specified performance and space requirements, given a level of desired performance, attributes of the user's workload, the varying performance attributes of storage and its response to different types of workloads, and the presence of competing work loads within the network.

The virtual disk allocator 272 satisfies requests for storage within the network of storage elements in such a way as to meet the performance requirements specified with the request, or through a storage policy mechanism. The virtual disk allocator 272 can operate in environments such as the IBM2145 SAN Volume Controller (SAN VC), which is a virtualized storage subsystem. The virtual disk allocator 272 may determine performance characteristics of managed disks. The virtual disk allocator 272 may further determine relationships between managed disks and resource groups based on user defined or automated input, and create a virtual disk that includes a set of the managed disks, taking into consideration the resource groups, and the resource group storage resources such as cache and data paths, to which the managed disks are allocated.

The virtual disk allocator 272 extends the policy-based aspects to Open System Environments and automates the selection of storage elements within virtualized storage subsystems to meet performance requirements. Recommending the selected storage elements within the virtualized storage system allows for optimal usage of striped or composite volumes supported by the OS or Volume Manager software, or applications (such as database applications) which support the concept of striped volumes, such as DB2 and other database products. The virtual disk allocator 272 also extends the notions of allocating storage taking into consideration long-term data usage patterns. The virtual disk allocator 272 incorporates various algorithms required to make intelligent choice of data placement.

The virtual disk allocator 272 may make determinations of which nodes, i.e., engines such as the virtualization engine 274, may access the data, and which managed disk groups (MDGs), groups of disks supporting a virtual disk, would compose the logical disks (LUNs) to be selected. Within the MDG is at least one managed disk, which is used by a virtualization engine 274 and volume manager 276 to stripe data within the virtual disk, which is comparable to logical disks in Enterprise Storage Systems (ESS). The virtual disk allocator 272 can thus select a LUN or a plurality of LUNs in multiple resource groups across multiple storage elements in order to meet the customer's desired level of performance. A virtualization engine 274 and volume manager 276 may be used to stripe data within a virtual disk across managed disks. The virtualization optimizer 272 may make determinations of which nodes, i.e., engines such as the virtualization engine 274, may access the data, and which managed disk groups (groups of disks) would compose the LUNs to be selected. An additional important application of this would be to use the virtualization optimizer 272 to determine how to relocate, e.g., nodes or managed disk groups, the LUNs, i.e., virtual disks, to meet the customer's desired level of performance.

Administrator 270 is shown including a memory module 292 and a processor 294. Processor 294 may execute instructions to perform various mechanisms as will be further illustrated. The instructions to implement these mechanisms or performance data processed by these mechanisms may be stored in memory module 292. In addition, as will be further described, a workload profile for a specific storage provisioning scheme may be created and stored on memory module 292.

Adviser module 278 is operational on the administrator 270. Adviser module 278 provides provisioning recommendations as well as predictions to a user based on estimates received from capacity estimation module 280 and placement estimation module 282. The functionality of the adviser module 278, the capacity estimation module 280 and the placement estimation module 282 will be further described below in further detail in view of point-in-time copy functionality. However, as previously described, and as one skilled in the art will appreciate, the functionality of adviser module 278, capacity estimation module 280, and the placement estimation module 282 may be applicable to various types of storage provisioning.

Current storage products managed and monitored by devices such as an administrator 270 include so-called "point-in-time" copy functionality. Point-in-time copy functionality is a technology in the storage microcode that makes it possible to very rapidly provide a copy (or apparent copy) of a volume without necessarily reading all the data from the source volume and writing it to a target volume. This is done through bitmaps and algorithms which control when data must actually be moved to the target. Point in time copy functionality has provided great advantage in reducing the amount of time that source volumes must have their input/output (I/O) activity quiesced in order to produce consistent target volumes for data backup, archive, or data mining purposes.

In many applications, point-in-time copy functionality need only make a copy of data that is actually changed in the source volumes, yet until recently the entire capacity of the source volumes had to be allocated and reserved for the targets of the functionality. Recent enhancement to various point-in-time copy implementations now allow the target volumes to be much smaller that the space allocated for the source volumes, anticipating that only data that actually gets changed in the source volumes needs to be copied to the target volumes. In these cases, the target volumes are said to be "thin or thinly provisioned."

There are two potential problems associated with allocation of the target space for point-in-time copy functionality. The first relates to how much space needs actually to be allocated, and where the space should be located. The second relates to what happens if the space allocated for the target volumes proves insufficient because more data gets changed on the source volumes than anticipated. Currently, both of these decisions are judgments made by storage management personnel, such as the storage administrator role described previously.

To a first order of approximation, the capacity allocated to provision the point-in-time targets need be only as large as the total amount of source data that is changed during the "lifetime" of the point-in-time copy. Various considerations may be taken into account when trying to estimate how large the target allocation needs to actually be. An estimate can be derived from the rate of writes and the number of megabytes per second of changed data. This data can be obtained from the performance data captured by the administrator 270. It can be captured into a "workload profile" for the source volumes during a window of time representative of the production workload during the time a point-in-time copy needs to be taken. Such workload profiles can be created and managed by tools operational on the administrator 270, such as various hardware, software and firmware mechanisms. In one embodiment, the workload profile may be stored in the memory module 292.

For a better overall recommendation for the target volumes to a user, additional information beyond rate of change data may be taken into account. A total amount of changed data may also include a consideration of the duration or lifetime of the point-in-time copy target, permitting an estimate of the total number of changed bytes to be accumulated in the target space. Consideration the duration of the point-in-time copy target results in a better estimate of the target capacity requirement.

To obtain such additional information, such as the duration information, the user may supply input data estimates himself to the administrator 270. Another technique may involve automated analysis of performance data collected during a test window, or such an analysis further refined by subsequent measurements during production epochs. These parameters would be added to those included in current workload profiles.

Additional considerations toward a capacity requirement may be taken into account. These considerations may include an amount of data that is written and rewritten in the source volumes. If data is written and re-written several times, it need be allocated only once in the target capacity. These considerations may be facilitated by additional metrics in the workload profiles to provide estimates or historical measurements to answer these questions well enough to make intelligent estimates of the target capacity required. These parameters, as in the previous paragraph, can be refined in the workload profiles kept by an implementation of these algorithms. Such refinements can be derived by user input, or by analysis of actual production performance data.

Adviser module 278 may be adapted to estimate the performance (resource utilization) impact of the point-in-time copy traffic, both on the source and target volumes, in order to recommend a good location for the target volumes. To accomplish such functionality, the workload profile may be supplemented with parameters relating to a rate of write activity and an average transfer size of the writes. These parameters are then considered along with the other metrics described above.

After performing the various considerations, adviser module 278 may make recommendations about required capacity, or present judgments about existing capacities, and also predict the resulting performance impact on the source as well as target resources of the point-in-time copy. The user would be free to accept the recommendations, or to modify various inputs to try to obtain better advice, or to use the advice as a template for manual implementation of various point-in-time copy functionality.

Figure 3:
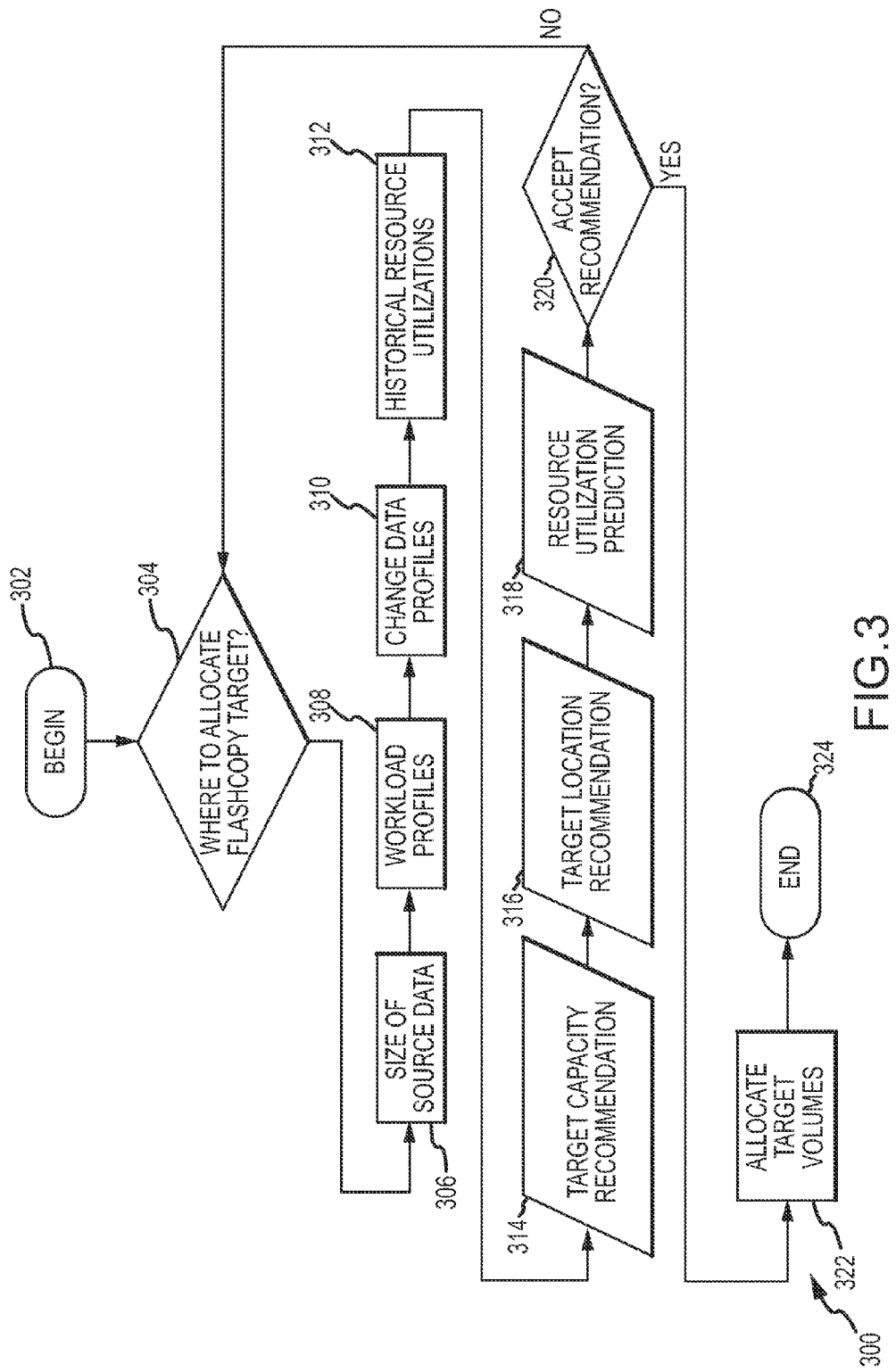
FIG. 3 illustrates a first exemplary method for thin-provisioning storage in a storage system such as a SAN.

Turning to FIG. 3 an exemplary method 300 is depicted for providing capacity and placement advice to a user for thinly-provisioned point-in-time target spaces. As one skilled in the art will appreciate, various steps in the method 300 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. In addition and as previously described, while the method 300 relates specifically to point-in-time copy functionality, various steps in the method 300 may be adapted for provisioning of storage in other scenarios and implementations.

Method 300 begins (step 302) with a query by the adviser of where to allocate a particular point-in-time, or "Flashcopy" target (step 304). Various considerations are taken into account, including the size of source data (step 306), various parameters/metrics from the applicable workload profile (step 308), including measurements of changed data that may be grouped into one or more changed data profiles (step 310). In addition, various historical resource utilization measurements may be considered, (step 312).

Based on the considerations previously, described, the adviser makes target capacity recommendations based on a target capacity estimate derived from the considered data (step 314). The adviser makes target location recommendations based on a placement estimate derived from the considered data (step 316). The adviser makes a resource utilization prediction as previously described (step 318). The recommendations and predictions are supplied to a user for review and consideration. If the user does not accept the recommendation(s) (step 320), the method 300 begins anew. If the user does accept the recommendation(s) (again, step 320), the administrator allocates appropriate target volumes (step 322). The method 300 then ends (step 324).

Figure 4:
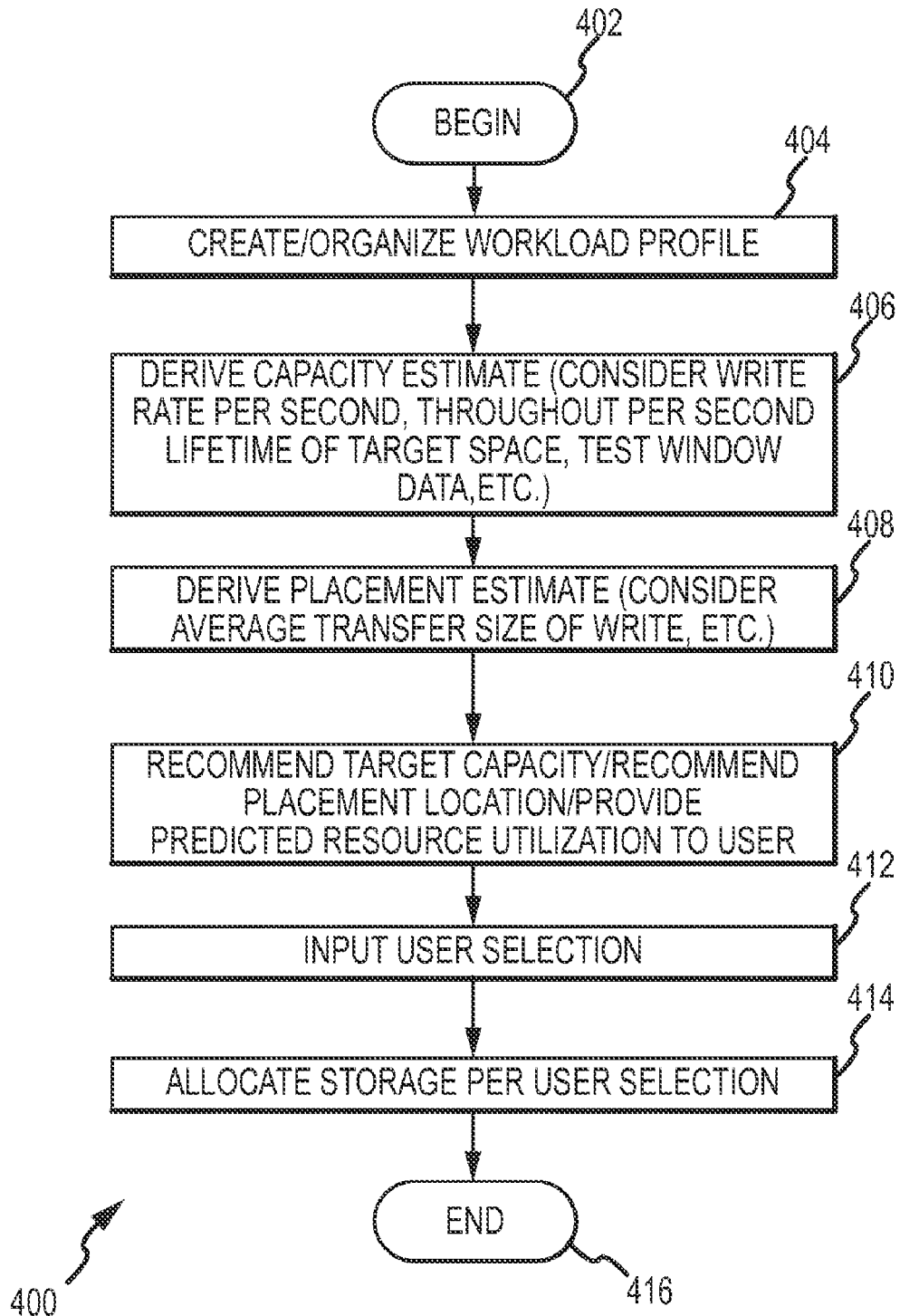
FIG. 4 illustrates a second exemplary method for thin-provisioning storage in a storage system using an adviser according to the present invention.

In view of the method 300 of FIG. 3, FIG. 4 illustrates an exemplary method 400 for providing storage provisioning advice to a user in a more generic sense. Method 400 begins (step 402) with the creation and organization of a workload profile (step 404). The workload profile may include various data relating to capacity and placement as previously described, such as a measurement of changed data per a predetermined time and resource utilization data over a period of time. The workload profile may be stored in a memory module of the administrator.

Using the capacity estimation module, a capacity estimate is derived from considerations of the data relating to capacity, such as write rates of the changed data over the predetermined time (e.g., seconds), throughput of the changed data (e.g., MB/sec), the duration value representative of the lifetime of the applicable target space, data collected during a test window, and the like (step 406). Using the placement estimation module, a placement estimate is then derived from considerations of the data relating to placement, such as the average transfer size of writes and the like (step 408). Based on the capacity and placement estimates, a target capacity recommendation, a placement location recommendation, and predicted resource utilization is provided to a user (step 410) by the adviser. The capacity estimate may be used to provide the target capacity recommendation. The placement estimate may be used to provide the placement location recommendation. Finally, the capacity or the placement estimate may be used to provide the predicted resource utilization.

The user, such as a storage administrator, is presented with the recommendations and predictions by the adviser module. The user enters his selection (such as accepting a particular recommendation) based on the recommendations and predictions to the adviser module. The selection is inputted (step 412) by the adviser module. Based on the user selection(s), the applicable storage is allocated (step 414). The method 400 then ends (step 416).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for thin-provisioning of storage in a storage system including a processor coupled to the storage, comprising:
    creating, via the processor, a workload profile of the storage from performance data, the workload profile including a measurement of changed data per a predetermined time and first resource utilization data over a period of time;
    deriving, via the processor, a capacity estimate from the measurement of changed data per a predetermined time;
    deriving, via the processor, a placement estimate from the resource utilization data obtained over a period of time;
    recommending, by the processor, a target capacity and a placement location to a user, the target capacity based on the capacity estimate and the placement location based on the placement estimate;
    providing, by the processor, a predicted resource performance impact to the user based on the capacity estimate and the placement estimate; and
    providing, by the processor, a location recommendation to the user based on second resource utilization for a source volume and a target volume,
    wherein the capacity estimate from the measurement of changed data comprises considering data that is written to the source volume a plurality of times as a single data write when measuring changed data.

2. The method of claim 1, further including:
    inputting, by the processor, a user selection based on the target capacity, the placement location, or the predicted resource performance impact, and
    allocating, via the processor, the storage per the user selection.

3. The method of claim 1, wherein deriving a capacity estimate from the measurement of changed data per a predetermined time includes considering a write rate of the changed data over the predetermined time.

4. The method of claim 1, wherein deriving a capacity estimate from the measurement of changed data per a predetermined time includes considering a throughput of the changed data.

5. The method of claim 1, wherein deriving a capacity estimate from the measurement of changed data per a predetermined time includes considering a duration value representative of a lifetime of a target space of the storage.

6. The method of claim 1, wherein deriving a capacity estimate from the measurement of changed data per a predetermined time includes considering test data collected during a test window.

7. The method of claim 1, wherein deriving a placement estimate from the resource performance impact data obtained over a period of time includes considering an average transfer size of a write.

8. An administrator device for thin-provisioning of storage for a plurality of storage devices, comprising:
    a processor; and
    a memory device coupled to the processor, the memory device comprising:
        a memory module configured to store a workload profile of the storage created from performance data, the workload profile including a measurement of changed data per a predetermined time and first resource utilization data over a period of time;
        a capacity estimation module in communication with the memory module, the capacity estimation module comprising code configured to derive a capacity estimate from the measurement of changed data per a predetermined time;
        a placement estimation module in communication with the capacity estimation module, the placement estimation module comprising code configured to derive a placement estimate from the resource utilization data obtained over a period of time;
    an adviser module in communication with the placement estimation module, the adviser module comprising code configured to:
        recommend a target capacity to a user based on the capacity estimate,
        recommend a placement location to the user based on the placement estimate,
        provide a predicted resource performance impact to the user based on the capacity estimate and placement estimate, and
        provide a location recommendation to the user based on second resource utilization for a source volume and a target volume,
    wherein, when deriving the capacity estimate from the measurement of changed data, the capacity estimation module is configured to consider data that is written to the source volume a plurality of times as a single data write when measuring changed data.

9. The device of claim 8, wherein the adviser module is further configured to input a user selection based on the target capacity, the placement location, or the predicted resource performance impact.

10. The device of claim 9, wherein the memory device further comprises a virtual disk allocator in communication with the adviser module, the virtual disk allocator comprising code configured to allocate the storage per the user selection.

11. The device of claim 10, wherein the virtual disk allocator allocates virtual volumes as thinly-provisioned point-in-time copy target spaces.

12. The device of claim 8, wherein the capacity estimation module is further configured to consider a write rate of the changed data over the predetermined time, considering a throughput of the changed data, considering a duration value representative of a lifetime of a target space of the storage.

13. The device of claim 8, wherein the placement estimation module is further configured to consider an average transfer size of a write.

14. The device of claim 8, wherein the predicted resource performance impact is obtained for source and target spaces of the storage.

15. A computer program product for thin-provisioning of storage in a storage system by an adviser, the computer program product comprising a non-transitory computer-readable storage medium having computer-readable program code portions stored therein, the computer-readable program code portions comprising:
    a first executable portion for creating a workload profile of the storage from performance data, the workload profile including a measurement of changed data per a predetermined time and first resource utilization data over a period of time;
    a second executable portion for deriving a capacity estimate from the measurement of changed data per a predetermined time;
    a third executable portion for deriving a placement estimate from the resource utilization data obtained over a period of time;
    a fourth executable portion for recommending a target capacity and a placement location to a user, the target capacity based on the capacity estimate and the placement location based on the placement estimate;
    a fifth executable portion for providing a predicted resource performance impact to the user based on the capacity estimate and the placement estimate; and
    a sixth executable portion for providing a location recommendation to the user based on second resource utilization for a source volume and a target volume,
    wherein the capacity estimate from the measurement of changed data comprises considering data that is written to the source volume a plurality of times as a single data write when measuring changed data.

16. The computer program product of claim 15, further including:
    a seventh executable portion for inputting a user selection based on the target capacity, the placement location, or the predicted resource performance impact, and
    an eighth executable portion for allocating the storage per the user selection.

17. The computer program product of claim 15, wherein the second executable portion for deriving a capacity estimate from the measurement of changed data per a predetermined time includes a seventh executable portion for considering a write rate of the changed data over the predetermined time.

18. The computer program product of claim 15, wherein the second executable portion for deriving a capacity estimate from the measurement of changed data per a predetermined time includes a seventh executable portion for considering a throughput of the changed data.

19. The computer program product of claim 15, wherein the second executable portion for deriving a capacity estimate from the measurement of changed data per a predetermined time includes a seventh executable portion for considering a duration value representative of a lifetime of a target space of the storage.

20. The computer program product of claim 15, wherein:
    the second executable portion for deriving a capacity estimate from the measurement of changed data per a predetermined time includes a seventh executable portion for considering test data collected during a test window, and
    the third executable portion for deriving a placement estimate from the resource utilization data obtained over a period of time includes an eighth executable portion for considering an average transfer size of a write.

* * * * *